(12) United States Patent
Shimasaki

(10) Patent No.: US 7,376,687 B2
(45) Date of Patent: May 20, 2008

(54) PSEUDO-RANDOM NUMBER GENERATOR

(75) Inventor: Shinya Shimasaki, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 796 days.

(21) Appl. No.: 10/808,240

(22) Filed: Mar. 25, 2004

(65) Prior Publication Data

US 2004/0193664 A1    Sep. 30, 2004

(30) Foreign Application Priority Data

Mar. 31, 2003    (JP) .............................. 2003-095596

(51) Int. Cl.
*G06F 1/02* (2006.01)

(52) U.S. Cl. .................................... 708/251

(58) Field of Classification Search ......... 708/250–256
See application file for complete search history.

(56) References Cited

U.S. PATENT DOCUMENTS

| | | | | |
|---|---|---|---|---|
| 3,777,278 | A * | 12/1973 | Majeau et al. ............... | 708/252 |
| 3,790,768 | A | 2/1974 | Chevalier et al. | |
| 4,719,643 | A * | 1/1988 | Beeman ....................... | 708/252 |
| 5,963,104 | A * | 10/1999 | Buer ............................ | 708/250 |
| 6,263,082 | B1 * | 7/2001 | Ishimoto et al. ............ | 708/250 |
| 6,480,869 | B1 | 11/2002 | Fujioka | |
| 6,963,888 | B2 * | 11/2005 | Weimerskirch ............. | 708/250 |
| 2001/0033663 | A1 * | 10/2001 | Ishimoto et al. ............ | 708/252 |
| 2004/0049525 | A1 * | 3/2004 | Hars .......................... | 708/250 |

FOREIGN PATENT DOCUMENTS

| | | |
|---|---|---|
| EP | 0 095 272 | 11/1983 |
| EP | 0 855 642 | 7/1998 |
| JP | 3-184414 | 8/1991 |
| JP | 6-44051 | 2/1994 |

(Continued)

OTHER PUBLICATIONS

Chen et al., "BIST Structure and Test Vector Generation Based on a Controlled LFSR," *Journal of Circuits and Systems*, vol. 7, No. 3, Sep. 2002, pp. 13-16, no translation.

(Continued)

*Primary Examiner*—Chat C. Do
(74) *Attorney, Agent, or Firm*—Young & Thompson (57) ABSTRACT

A pseudo-random number generator comprises a linear feedback register for generating pseudo-random numbers; and a signal generator for generating a shift clock for operating a linear feedback register and predetermined input data. The linear feedback register has a plurality of registers connected in series, a first logical operation circuit for taking logical operation of output data from predetermined registers to deliver the result thereof, and a second logical operation circuit for taking logical operation of input data supplied from the outside and output data of the first logical operation circuit to supply the result thereof to any one of the registers.

5 Claims, 6 Drawing Sheets

FOREIGN PATENT DOCUMENTS

| | | | |
|---|---|---|---|
| JP | 7-248904 | 9/1995 | |
| JP | 9-325881 | 12/1997 | |
| JP | 10-112638 | 4/1998 | |
| JP | 11-45173 | 2/1999 | |
| JP | 11-95984 | 4/1999 | |
| JP | 11-143852 | 5/1999 | |
| JP | 2937919 | 6/1999 | |
| JP | 11-312078 | 11/1999 | JP |
| | 2002-540482 | 11/2002 | |

OTHER PUBLICATIONS

Tao et al., "Intelligent Control Dual-Channel Pseudorandom Signal Generator," Tsinghua Tongfang Optical Disc Co., Ltd., vol. 23, No. 4, Aug. 2002, pp. 382-385, no translation.

Yingjie et al., "The Design Methods for the Programmable S Box and Feedback Shift Register," Nov. 2001, pp. 48-51, no translation.

* cited by examiner

PSEUDO-RANDOM NUMBER GENERATOR

BACKGROUND OF THE INVENTION

1. Field of the Invention

The present invention relates to a pseudo-random number generator which employs a linear feedback shift register (hereinafter abbreviated as "LFSR") to generate pseudo-random numbers.

2. Description of the Related Art

While random numbers have been conventionally used for cryptographic algorithms and the like, pseudo-random numbers, which can be generated more easily than true random numbers, tend to be more frequently used because they can be readily handled and processed.

A pseudo-random number generator for generating pseudo-random numbers typically employs LFSR to generate random numbers having a long cycle. The LFSR comprises a plurality of registers connected in series, and an exclusive OR logic circuit (hereinafter called the "XOR circuit"), wherein output data of predetermined registers are fed back to the first one of the registers through the XOR circuit. With the XOR circuit provided in a feedback path, the LFSR delivers random numbers having a relatively long cycle.

For example, LFSR comprised of n registers produces random numbers, the cycle of which is an n-th order linear maximum cycle series (called "M-series") 2n−1. It should be noted that random numbers provided by the LFSR are repeatedly generated random numbers of the M-series, and the cycle of the LFSR does not refer to a time period, but to the length of the M-series.

In a cryptographic circuit for generating a cryptogram using pseudo-random numbers, and the like, if pseudo-random number series or pseudo-random number generation logic is revealed, an original plaintext can be restored from an acquired cryptogram, thus making it important to efficiently generate unpredictable random number series.

While pseudo-random number series or pseudo-random number generation logic is more difficult to be broken as the order number n of LFSR (the number of registers) is larger for the number of bits of random numbers generated thereby, only LFSR having a small number of bits can be used in some cases due to such constraints as a circuit scale. To address this situation, a variety of techniques have been studied for improving the randomness of pseudo-random numbers generated by lower-order LFSR, and Japanese Patent No. 2937919, for example, describes a pseudo-random number generator which comprises a plurality of clocks at different frequencies, and switches an operation clock (shift clock) supplied to each of registers in LFSR using a predetermined output of the LFSR.

When a shift clock is fixed, the LFSR repeatedly generates the same random number series at a predetermined cycle from a predetermined initial value (SEED). On the other hand, the pseudo-random number generator described in Japanese Patent No. 2937919 cited above switches shift clocks using a predetermined output of the LFSR to cause variations in timing of a shifting operation, with the result that an apparent cycle becomes longer than the cycle determined by the order number of the LFSR.

Figure 1:
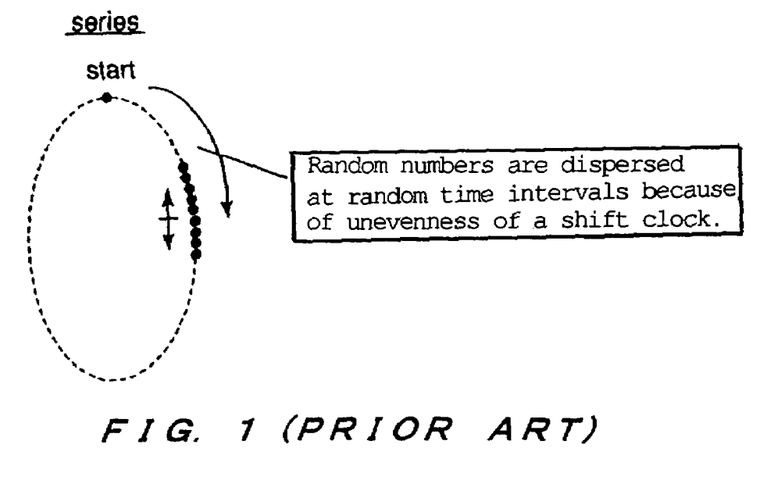
FIG. 1 is a schematic diagram showing a random number series generated by a conventional pseudo-random number generator.

However, while the foregoing configuration relies on variations in the shifting operation to vary the timing at which a random number is generated, SEED and random number series generated thereby are equal to those which are generated with a fixed shift clock. Specifically, as illustrated in FIG. 1, while random numbers are generated at random time intervals (note, however, that they are continuously generated (dispersed) at constant intervals, when viewed in a certain short duration), they will not disturb the order of random numbers which are generated with a fixed shift clock. Thus, while the pseudo-random number generator described in Japanese Patent No. 2937919 simply improves the randomness over the configuration with a fixed shift clock, it still fails to provide a sufficiently high randomness because of its ever high susceptibility to identification of the pseudo-random number series or the pseudo-random number generation logic.

SUMMARY OF THE INVENTION

It is therefore an object of the present invention to provide a pseudo-random number generator which is capable of accomplishing a high randomness, and making it more difficult to analyze its circuit configuration from generated random number series.

To achieve the above object, a pseudo-random number generator according to the present invention has a LFSR which includes a first logical operation circuit for outputting a result of a logical operation of output data from predetermined registers; and a second logical operation circuit for outputting a result of a logical operation of input data supplied from the outside and the output signal of the first logical operation circuit to any one of the registers of LFSR. In the foregoing configuration, the one of the registers is fed back with the result of the logical operation of input data supplied from the outside and the result of logical operation of output data from predetermined registers, so that the linear feedback register generates more irregular random number series to improve the randomness.

Also, when the pseudo-random number generator is powered on, a clock, which is generated before the oscillator is stabilized in its oscillation and is therefore unstable in frequency, is supplied to the linear feedback register as a shift clock to generate Pre-SEED on which generating an initial value (SEED) for the linear feedback register is based. The pseudo-random number generator thus configured can improve the randomness for Pre-SEED and SEED generated on the basis of Pre-SEED.

Further, the pseudo-random number generator can write into each register of linear feedback register by the result of logical operation of arbitrary data entered from the outside and output data of the linear feedback register. This configuration can further improve the randomness for SEED generated by the linear feedback register.

Consequently, the resulting random-number generator circuit of the present invention provides a high randomness, and it is harder to analyze the circuit configuration from generated random number series.

The above and other objects, features, and advantages of the present invention will become apparent from the following description with reference to the accompanying drawings which illustrate examples of the present invention.

DETAILED DESCRIPTION OF THE PREFERRED EMBODIMENT

Figure 2:
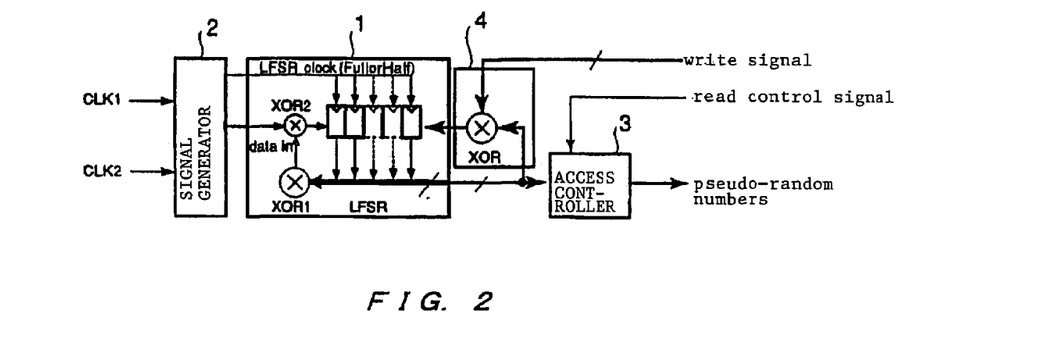
FIG. 2 is a block diagram illustrating the configuration of a pseudo-random number generator according to the present invention associated with a normal operation thereof.

As illustrated in FIG. 2, a pseudo-random number generator according to the present invention comprises LFSR 1; signal generator 2 for generating a shift clock (LFSR clock) for operating LFSR 1 and predetermined input data (data in); access controller 3 for controlling a read of random numbers generated by LFSR 1; and write circuit 4 for writing data supplied from the outside into each register of LFSR 1. In addition, the pseudo-random number generator according to the present invention comprises Pre-SEED circuit 5 for generating Pre-SEED which is relied on to define an initial value (SEED) of LFSR 1 in a reset time immediately after power-on, as illustrated in FIG. 3.

Figure 3:
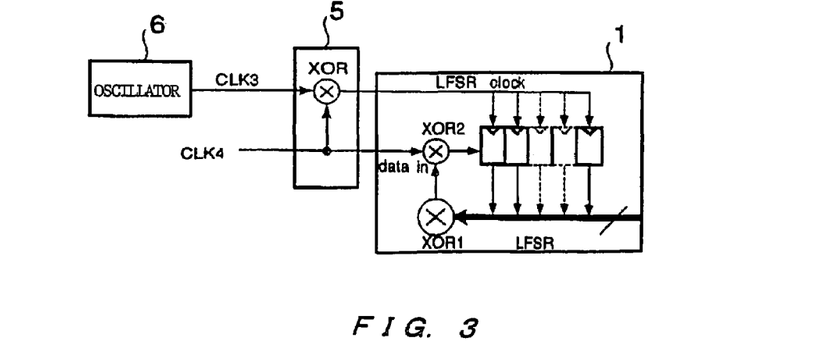
FIG. 3 is a block diagram illustrating the configuration of the pseudo-random number generator illustrated in FIG. 2 associated with a reset time thereof.

FIGS. 2 and 3 illustrate the configuration of the pseudo-random number generator according to the present invention in two parts for facilitating the explanation of its operation, later described, wherein FIG. 2 illustrates the configuration associated with a normal operation, and FIG. 3 illustrates the configuration associated with the reset time immediately after the pseudo-random number generator is powered on. The pseudo-random number generator of the present invention may comprise all or part of the components shown in FIGS. 2 and 3. When the pseudo-random number generator comprises all the components shown in FIGS. 2 and 3, an input to LFSR 1 may be switched depending on the normal operation or reset time, or alternatively LFSR 1 may be fed at all times with both of an output signal of signal generator 2 and an output signal of Pre-SEED circuit 5 as long as the operation of the circuit is not affected by the signals.

First clock CLK1 supplied to signal generator 2 shown in FIG. 2 is a clock at a constant period generated by a ring oscillator or the like. Second clock CLK2 in turn is a clock synchronized to first clock CLK1 using a flip-flop or the like, supplied from an oscillator, not shown, which may comprise a quartz oscillator and the like, or from the outside.

On the other hand, third clock CLK3 supplied to Pre-SEED circuit 5 shown in FIG. 3 is a clock at a constant period generated by oscillator 6 such as a ring oscillator, in a manner similar to first clock CLK1. Fourth clock CLK4 in turn is a clock asynchronous to first clock CLK1, supplied from an oscillator, not shown, which may comprise a quartz oscillator and the like, or from the outside.

For third clock CLK3, the clock generated by oscillator 6 comprising a ring oscillator and the like is used as it is for improving the randomness of Pre-SEED, as will be later described. First clock CLK1 is free from such restrictions, so that first clock CLK1 may be the clock generated by oscillator 6 used as it is, or a clock which may be passed through, for example, a control circuit, not shown, for controlling delivery/stop of the clock.

Figure 4:
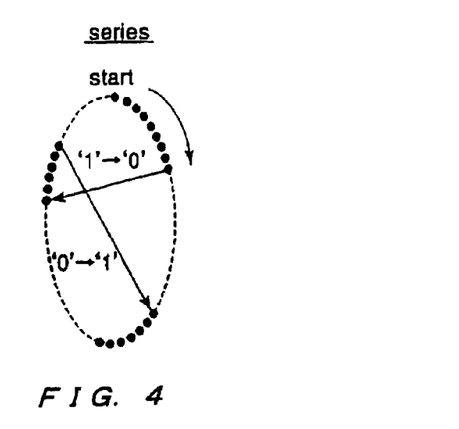
FIG. 4 is a schematic diagram showing a random number series generated by the pseudo-random number generator of the present invention.

As illustrated in FIGS. 2 and 3, LFSR 1 comprises a plurality of registers connected in series; a first XOR circuit (XOR1) for taking exclusive OR of outputs of predetermined registers to deliver the result of the logical operation; and a second XOR circuit (XOR2) for supplying the first register of LFSR 1 with exclusive OR of input data supplied from signal generator 2 and the output data of the first XOR circuit. Thus, in the pseudo-random number generator of the present invention, data delivered from the first XOR circuit and fed back to the first one of the registers of LFSR 1 is varied by input data supplied from the outside via the second XOR circuit such that LFSR 1 delivers more random data series, thereby improving the randomness, as shown in FIG. 4. The first XOR circuit and the second XOR circuit may be a logical operation circuit of an exclusive NOR logic circuit, AND logic circuit, NAND logic circuit, OR logic circuit, NOR logic circuit, or a circuit composed thereof or the like. The output of the second XOR circuit may be supplied to the any one of the registers of the LFSR 1.

Also, the pseudo-random number generator of the present invention employs LFSR 1 which has an order number larger than the number of bits of random numbers generated thereby. For example, 26-bit LFSR 1 is used when 16-bit pseudo-random numbers are generated. This is because such LFSR 1 provides a higher randomness for the pseudo-random numbers generated thereby than those generated using 16-bit LFSR 1, as described above.

Further, in the pseudo-random number generator of the present invention, signal generator 2 generates a plurality of shift clocks at different frequencies, such that the frequency of the shift clock supplied to LFSR 1 is switched at predetermined intervals. Specifically, signal generator 2 generates a divided clock (Half) at a frequency half as high from first clock CLK1 (Full), and switches first clock CLK1 and the divided clock at predetermined intervals for delivery to LFSR 1 as the shift clock. The divided clock is not necessarily at the frequency half as high as first clock CLK1, but may be at any frequency such as ¼, ⅛, 1/16, and so on as high as first clock CLK1.

Further, in the pseudo-random number generator of the present invention, random numbers generated by LFSR 1 are read at predetermined intervals under the control of access controller 3. Specifically, LFSR 1 generates a random number each time it is fed with a shift clock during a normal operation, whereas access controller 3 does not read a random number generated by LFSR 1 at the timing of the shift clock but at a timing of a clock having a different period.

Write circuit 4 is provided for the user to write arbitrary data into each register of LFSR 1 in order to further improve the randomness of the initial value (SEED) for LFSR 1, and comprises a plurality of XOR circuits each for taking exclusive OR of output data from LFSR 1 and a write signal, which is data written by the user, to deliver the result of the logical operation. Write circuit 4 may comprise, for example, a number of XOR circuits equal to the number of bits of a generated initial value. Output data of each XOR circuit is written into a predetermined register of LFSR 1 through a selector or the like (rewriting means). FIG. 2 shows the configuration of the write circuit 4 composed of one XOR circuit, however a number of XOR circuits of write circuit 4 may be two or more. In this case, output data of each XOR circuit may be written into an arbitrary register of LFSR. The XOR circuits of write circuit 4 may be a logical operation circuit of an exclusive NOR logic circuit, AND logic circuit, NAND logic circuit, OR logic circuit, NOR logic circuit, or a circuit composed thereof or the like.

As illustrated in FIG. 3, Pre-SEED circuit 5 comprises an XOR circuit which receives third clock CLK3 and fourth clock CLK4 and supplies LFSR 1 with a shift clock which is the result of a exclusive OR operation taken for the two clocks. During a reset time immediately after power-on, LFSR 1 is supplied with fourth clock CLK4 as input data. The exclusive OR circuit of Pre-SEED circuit 5 may be a logical operation circuit of an exclusive NOR logic circuit, AND logic circuit, NAND logic circuit, OR logic circuit, NOR logic circuit, or a circuit composed thereof or the like.

Next, the operation of the pseudo-random number generator according to the present invention will be described with reference to FIGS. 2, 3 and 5 to 11.

The pseudo-random number generator of the present invention presents different operations during a reset time immediately after power-on and in a normal state. The operation during the reset time will be first described with reference to FIG. 3.

As described above, third clock CLK3 used during the reset time is the clock as generated by oscillator 6 which comprises a ring oscillator or the like. Since the reset time follows immediately after the pseudo-random number generator is powered on, the ring oscillator is not stable in its oscillating operation, resulting in a varying frequency of third clock CLK3.

In the present invention, LFSR 1 is supplied with a shift clock which is the result of a exclusive OR operation taken for such unstable third clock CLK3 and fourth clock CLK4 which is asynchronous to third clock CLK3. Thus, LFSR 1 can be provided with Pre-SEED which presents a higher randomness.

Next, the operation of the pseudo-random number generator of the present invention in its normal state will be described with reference to FIGS. 5 to 11 as well as to FIG. 2.

Figure 5:
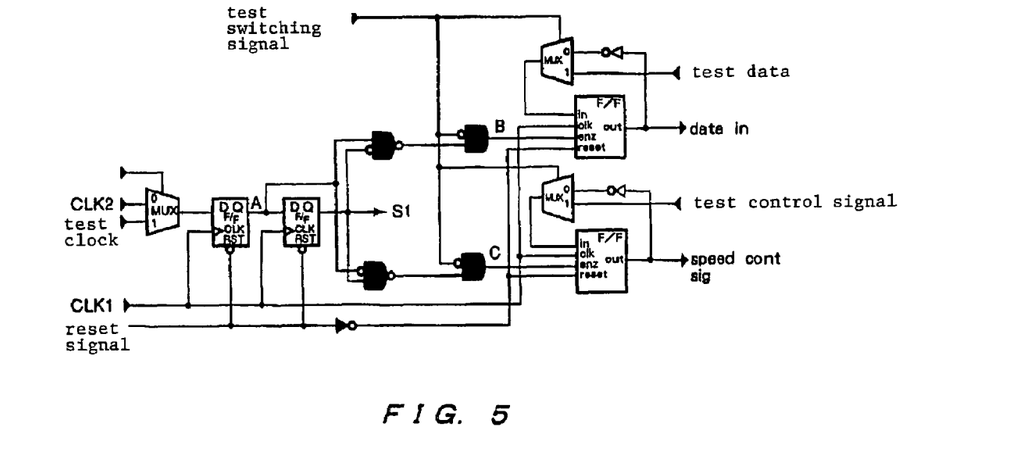
FIG. 5 is a circuit diagram illustrating an exemplary configuration of a circuit for generating input data included in a signal generator shown in FIG. 2.
Figure 6:
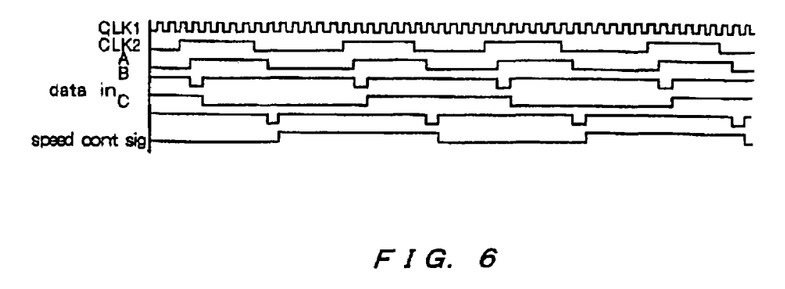
FIG. 6 is a timing chart representing the operation of the circuit illustrated in FIG. 5.
Figure 7:
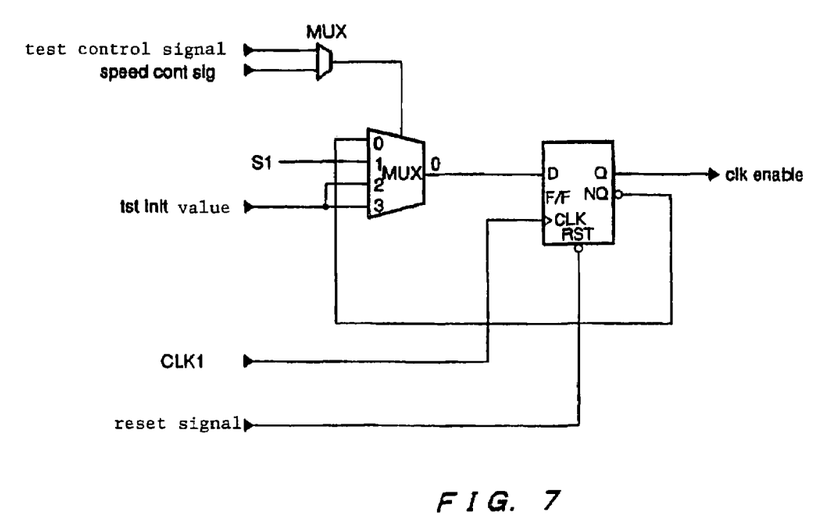
FIG. 7 is a circuit diagram illustrating an exemplary configuration of a circuit for generating a shift clock included in the signal generator shown in FIG. 2.
Figure 8:
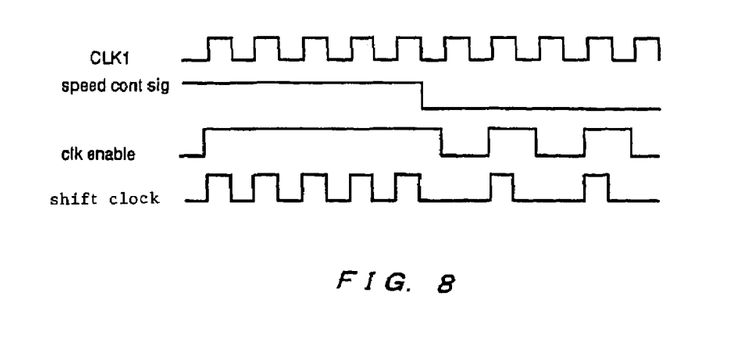
FIG. 8 is a timing chart representing the operation of the circuit illustrated in FIG. 7.
Figure 9:
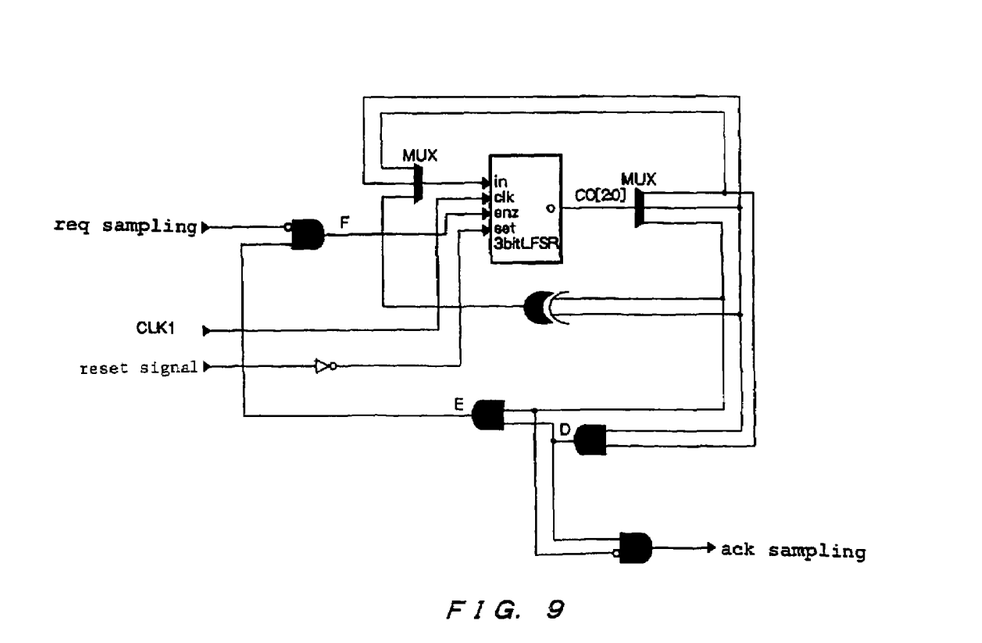
FIG. 9 is a circuit diagram illustrating an exemplary circuit configuration of an access controller shown in FIG. 2.
Figure 10:
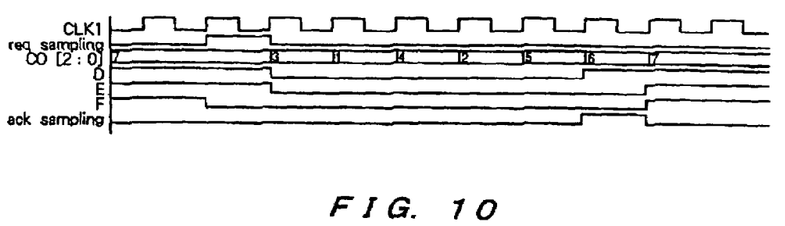
FIG. 10 is a timing chart representing the operation of the circuit illustrated in FIG. 9.
Figure 11:
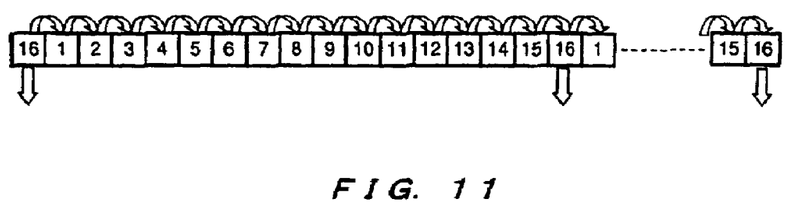
FIG. 11 is a schematic diagram representing the operation of the access controller shown in FIG. 2.

FIG. 5 is a circuit diagram illustrating an exemplary configuration of a circuit for generating input data included in signal generator 2 shown in FIG. 2. FIG. 6 is a timing chart representing the operation of the circuit illustrated in FIG. 5. FIG. 7 is a circuit diagram illustrating an exemplary configuration of a circuit for generating a shift clock included in the signal generator shown in FIG. 2. FIG. 8 is a timing chart representing the operation of the circuit illustrated in FIG. 7. FIG. 9 is a circuit diagram illustrating an exemplary configuration of access controller 3 shown in FIG. 2. FIG. 10 is a timing chart representing the operation of the circuit illustrated in FIG. 9. FIG. 11 is a schematic diagram representing the operation of access controller 3 shown in FIG. 2.

In the pseudo-random number generator of the present invention, upon expiration of the reset time, LFSR 1 first generates an initial value (SEED) for random numbers based on Pre-SEED generated during the reset time.

Further, since the pseudo-random number generator of the present invention comprises write circuit 4 for the user to write arbitrary data into each register of LFSR 1 from the outside as described above, the result of exclusive OR taken for data entered by the user (write signal) and the initial value generated by LFSR 1 can be written into each register of LFSR 1. The use of this function enables LFSR 1 to generate the initial value (SEED) which provides for a higher randomness. After generating the initial value (SEED), LFSR 1 sequentially generates random numbers starting from SEED. In this event, signal generator 2 switches the frequency of the shift clock supplied to LFSR 1 at predetermined intervals using the circuits illustrated in FIGS. 5 and 7.

FIG. 5 illustrates an exemplary circuit for generating a clock speed control signal (speed cont sig.) for controlling a timing for changing input data (data in) and shift clock supplied to LFSR 1.

In the circuit illustrated in FIG. 5, second clock CLK2 is first latched into a flip-flop (F/F) according to first clock CLK1 (as represented by A in FIG. 6), and a rising edge and a falling edge of second clock CLK2 are detected by associated logical gates, respectively (B, C in FIG. 6). Then, the circuit generates the input data (data in FIG. 6) which transitions from "1" to "0" or from "0" to "1" at a rising edge of second clock CLK2, and the clock speed control signal (speed cont sig. in FIG. 6) which transitions from "1" to "0" or from "0" to "1" at a falling edge of second clock CLK2.

The clock speed control signal (speed cont sig.) generated by the circuit illustrated in FIG. 5 is fed to the circuit illustrated in FIG. 7 which generates a clock enable signal (CLK enable) for controlling a timing for changing the shift clock. As illustrated in FIG. 7, the clock enable signal (CLK enable) can be generated by latching the output of a four-value selector (MUX), wherein the clock speed control signal (speed cont sig.) is used as a switching signal for the four-value selector. Specifically, when the clock speed control signal (speed cont sig.) is at "0," a latch circuit (F/F) for latching the output of the four-value selector (MUX) delivers an inversion of a preceding value fed to input terminal D at a rising timing of first clock CLK1, and divides first clock CLK1 by two to deliver the resulting signal as the clock enable signal (CLK enable).

On the other hand, when the clock speed control signal (speed cont sig.) is at "1," the latch circuit (F/F) for latching the output of the four-value selector (MUX) delivers a fixed value "1" as the clock enable signal (CLK enable) because the input data at input terminal D is fixed at "1."

The shift clock is generated, for example, by a gate circuit which receives the clock enable signal and first clock CLK1. In this event, the gate circuit delivers first clock CLK1 as it is when the clock enable signal is at "1," and delivers a shift clock at a frequency half as first clock CLK1 when the clock enable signal is at "0."

Each of the circuits illustrated in FIGS. 5 and 7 can be switched to input signals for testing by use of a test switching signal when the pseudo-random number generator is tested, wherein second clock CLK2, input data (data in), and clock speed control signal (speed cont sig.) can be switched to a test clock, a test data, and a test control signal supplied from the outside through associated selectors (MUX), respectively. When the test switching signal is valid (at "1"), the value of a tst init value signal shown in FIG. 7 becomes valid.

Access controller 3, which generates a timing signal for reading random numbers generated by LFSR 1 at predetermined intervals, comprises a counter circuit using a 3-bit LFSR, for example, as illustrated in FIG. 9.

For reading a random number from the pseudo-random number generator of the present invention, a read control signal (req sampling) is fed to the pseudo-random number generator. As represented in FIG. 10, upon receipt of the read control signal, access controller 3 starts operating 3-bit LFSR 1, and delivers a random number read enable signal (ack sampling) after the counter circuit has counted a predetermined number of first clocks CLK1 (six in the configuration of FIG. 9). The random number read enable signal thus delivered results in delivery of a random number generated by LFSR 1 and stored in a register, not shown, at that time. Any number may be set in the counter circuit which counts the set number of first clocks CLK1. The random number read period can be changed by modifying the configuration of the counter circuit.

FIG. 11 schematically represents how a random number is read every 16 clocks.

According to the pseudo-random number generator configured in accordance with the present invention, LFSR 1 comprises a first XOR circuit for taking exclusive OR of output data from predetermined registers to deliver the result thereof; and a second XOR circuit for taking exclusive OR of input data supplied from signal generator 2 and the output signal of the first XOR circuit to supply the result thereof to the first register of LFSR 1, such that the first register is fed back and the result of the exclusive OR taken for the result of the exclusive OR of the outputs from the predetermined registers with the input data supplied from the outside, thereby generating more irregular random number series from LFSR 1 to improve the randomness.

Also, when the pseudo-random number generator is powered on, third clock CLK3, which is generated before the oscillator is stabilized in its oscillation and is therefore unstable in frequency, is supplied to LFSR 1 as a shift clock to generate Pre-SEED on which generating an initial value (SEED) for LFSR 1 is based, thereby making it possible to improve the randomness for Pre-SEED and SEED generated on the basis of Pre-SEED.

The randomness is further improved for SEED by writing into a register the result of exclusive OR taken for arbitrary data entered from the outside through write circuit 4 and output data of LFSR 1.

The randomness of data delivered from LFSR 1 is significantly improved over the prior art by signal generator 2 which switches first clock CLK1 and the divided clock, generated by dividing first clock CLK1, at predetermined intervals and supplies LFSR 1 with either one as the shift clock. In addition, LFSR 1 is provided with a number of registers larger than the number of bits of random numbers generated thereby to significantly improve the randomness for data delivered from LFSR 1 over the prior art.

Consequently, the resulting random-number generator circuit of the present invention provides a high randomness, and it is harder to analyze the circuit configuration from generated random number series.

While preferred embodiments of the present invention have been described using specific terms, such description is for illustrative purposes only, and it is to be understood that changes and variations may be made without departing from the spirit or scope of the following claims.

What is claimed is:

1. A pseudo-random number generator comprising:
   a linear feedback register including a plurality of registers connected in series, a first logical operation circuit for taking logical operation of output data from the predetermined registers to deliver the result of the logical operation, and a second logical operation circuit for taking logical operation of input data supplied from the outside and output data of said first logical operation circuit to supply any one of said plurality of registers with the result of the logical operation, said linear feedback register generating pseudo-random numbers from said registers;
   an oscillator for generating a third clock which is unstable in frequency during a first time period immediately following turn-ON of said pseudo-random number generator;
   a Pre-SEED generator circuit for supplying, only during the first time period, said linear feedback register with a shift clock which is generated by taking logical operation of said third clock and a fourth clock asynchronous to said third clock and for supplying, only during the first time period, said linear feedback register with said input data which comprises said fourth clock;
   a signal generator for generating said shift clock for operating said linear feedback register only after the first time period and for generating said input data using a first clock at a constant period and a second clock synchronized to said first clock only after the first time period; and
   an access controller that extracts the pseudo-random numbers from said linear feedback register and outputs the pseudo-random numbers.

2. The pseudo-random number generator according to claim 1, wherein:
   said signal generator delivers said shift clock which is one of said first clock and a clock generated by dividing said first clock, said first clock and said divided clock being switched at predetermined intervals.

3. The pseudo-random number generator according to claim 1, wherein said access controller reads the pseudo-random numbers generated by said linear feedback register at a cycle different from the period of said shift clock.

4. The pseudorandom number generator according to claim 1, further comprising:
   a write circuit for providing logical operation of output data from said linear feedback register and arbitrary data entered from the outside,
   wherein said linear feedback register rewrites an initial value into said registers with data delivered from said write circuit.

5. The pseudo-random number generator according to claim 1, wherein said linear feedback register comprises a number of registers larger than the number of bits of said random number.

* * * * *